US012172475B2

(12) United States Patent
Teixeira, IV

(10) Patent No.: US 12,172,475 B2
(45) Date of Patent: Dec. 24, 2024

(54) TUBELESS VALVE ASSEMBLY

(71) Applicant: Specialized Bicycle Components, Inc., Morgan Hill, CA (US)

(72) Inventor: Charles Raymond Teixeira, IV, Bonny Doon, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 18/505,508

(22) Filed: Nov. 9, 2023

(65) Prior Publication Data

US 2024/0066931 A1 Feb. 29, 2024

Related U.S. Application Data

(63) Continuation of application No. 17/071,275, filed on Oct. 15, 2020, now abandoned, which is a continuation of application No. 15/863,599, filed on Jan. 5, 2018, now Pat. No. 10,807,424.

(51) Int. Cl.
*B60C 29/02* (2006.01)
*B60B 21/02* (2006.01)
(Continued)

(52) U.S. Cl.
CPC ............ *B60C 29/02* (2013.01); *B60B 21/025* (2013.01); *B60B 21/10* (2013.01); *B60B 21/12* (2013.01);
(Continued)

(58) Field of Classification Search
CPC ..... B60C 29/02; B60C 29/005; B60B 21/025; B60B 21/10; B60B 21/12;
(Continued)

(56) References Cited

U.S. PATENT DOCUMENTS 2,685,907 A * 8/1954 Waddell .................. B60C 29/02
152/410
3,963,361 A 6/1976 Schenk
(Continued)

FOREIGN PATENT DOCUMENTS

FR 2787064 A1 6/2000
WO WO-2017221371 A1 * 12/2017 ......... B60C 23/0494

OTHER PUBLICATIONS

Extended European Search Report for Application No. 18213595.4 dated Jun. 3, 2019 (8 pages).
(Continued)

*Primary Examiner* — Kip T Kotter
(74) *Attorney, Agent, or Firm* — Michael Best & Friedrich LLP

(57) ABSTRACT

A bicycle wheel comprises a rim and a valve assembly. The rim includes a radially inner wall having an inner opening and a radially outer wall having an outer opening. A first portion of the rim includes a first securing feature (e.g., inner threads). The valve assembly is positioned in the inner opening and outer opening and includes a second securing feature (e.g., outer threads) engaging the first securing feature. The rim can include a plate that defines the first engaging feature. The valve assembly preferably includes a valve stem and a resilient bumper coupled to the valve stem and aligned with a second portion of the rim. The valve assembly can further include a seal member compressed between the valve stem and the rim. Preferably, the seal member is positioned in an annular groove in an underside of an enlarged head of the valve stem.

16 Claims, 5 Drawing Sheets

(51) Int. Cl.
*B60B 21/10* (2006.01)
*B60B 21/12* (2006.01)
*B60B 27/02* (2006.01)
*B60C 29/00* (2006.01)
*F16K 27/02* (2006.01)
*B60B 1/00* (2006.01)

(52) U.S. Cl.
CPC .......... *B60B 27/023* (2013.01); *B60C 29/005* (2013.01); *F16K 27/0209* (2013.01); *B60B 1/003* (2013.01); *B60B 2310/305* (2013.01); *B60B 2360/30* (2013.01); *B60B 2900/5118* (2013.01)

(58) Field of Classification Search
CPC .......... B60B 2310/305; B60B 2360/30; B60B 2900/5118; B60B 1/003; B60B 27/023
See application file for complete search history.

(56) References Cited

U.S. PATENT DOCUMENTS

| | | |
|---|---|---|
| 4,564,056 A | 1/1986 | Doring |
| 5,450,886 A | 9/1995 | Girard |
| 6,119,746 A | 9/2000 | Lacombe et al. |
| 6,145,937 A * | 11/2000 | Chen ................ B60B 21/062 301/58 |
| 6,155,651 A | 12/2000 | Mizata et al. |
| 6,216,344 B1 | 4/2001 | Mercat et al. |
| 6,257,676 B1 | 7/2001 | Lacombe et al. |
| 6,443,533 B2 | 9/2002 | Lacombe et al. |
| 6,588,474 B2 | 7/2003 | Passarotto |
| 6,641,227 B2 | 11/2003 | Lacombe et al. |
| 6,820,668 B2 | 11/2004 | Passarotto |
| 7,448,696 B2 | 11/2008 | Meggiolan et al. |
| 8,668,278 B2 | 3/2014 | Meggiolan et al. |
| 9,079,454 B2 * | 7/2015 | Meggiolan ............... B60B 21/12 |
| 2002/0014293 A1 | 2/2002 | Passarotto |
| 2003/0127907 A1 | 7/2003 | Chen |
| 2005/0189813 A1 | 9/2005 | Bauer |
| 2013/0169031 A1 | 7/2013 | Alexandre et al. |
| 2013/0186536 A1 | 7/2013 | Lee |
| 2015/0360511 A1 | 12/2015 | Teixeira |

OTHER PUBLICATIONS

European Patent Office Action for Application No. 18213595.4 dated Jul. 7, 2022 (6 pages).

* cited by examiner

TUBELESS VALVE ASSEMBLY

CROSS-REFERENCE TO RELATED APPLICATIONS

This application is a continuation of U.S. patent application Ser. No. 17/071,275, filed on Oct. 15, 2020, which is a continuation of U.S. patent application Ser. No. 15/863,599, filed on Jan. 5, 2018 and issued as U.S. Pat. No. 10,807,424 on Oct. 20, 2020, the entire contents of each of which are incorporated herein by reference.

BACKGROUND

The present invention relates generally to the field of bicycle wheels and specifically to valve assemblies adapted primarily for use with tubeless tires.

Bicycle wheels commonly include an axle, a hub rotatable on the axle, spokes extending radially from the hub, a rim supported by the spokes, and a tire. Some wheels also include a pneumatic tube positioned inside the tire to facilitate inflation of the tire, while other wheels are "tubeless."

Tubeless wheels commonly include a hole in the rim and a valve assembly that is inserted through the hole in a radially inward direction from an interior of the rim (where the tire will be mounted) to an exterior of the rim (usually radially inward of the rim). The valve assembly typically includes an enlarged resilient portion on its radially outer end designed to seal against the rim around the hole on the interior of the rim. The radially inner end of the valve assembly is threaded to facilitate threading on a knurled nut, after the valve assembly is positioned in the hole in the rim, to secure the valve assembly onto the rim.

SUMMARY

The present invention provides a bicycle wheel comprising an axle, a hub mounted for rotation on the axle, a rim mounted for rotation with the hub, and a valve assembly. The rim includes a radially inner wall having an inner opening and a radially outer wall having an outer opening. A first portion of the rim (e.g., defining the inner opening or the outer opening, and preferably the outer opening) includes a first securing feature. The valve assembly is positioned in the inner opening and outer opening, and the valve assembly includes a second securing feature engaging the first securing feature to releasably secure the valve assembly to the rim. Preferably, the first securing feature comprises inner threads in the first portion of the rim, and the second securing feature comprises outer threads on the valve assembly, the outer threads being threaded into the inner threads. The rim can include a separate plate that defines the first engaging feature.

In one embodiment, the valve assembly includes a valve stem and a resilient bumper (e.g., an annular member) coupled to (e.g., wrapped around) the valve stem. The resilient bumper is aligned with a second portion of the rim defining either the inner opening or the outer opening (preferably the inner opening).

The valve assembly can further include a seal member compressed between the valve stem and the rim (e.g., positioned substantially adjacent the first and second securing features). Preferably, the seal member is positioned in an annular groove in an underside of an enlarged head of the valve stem.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
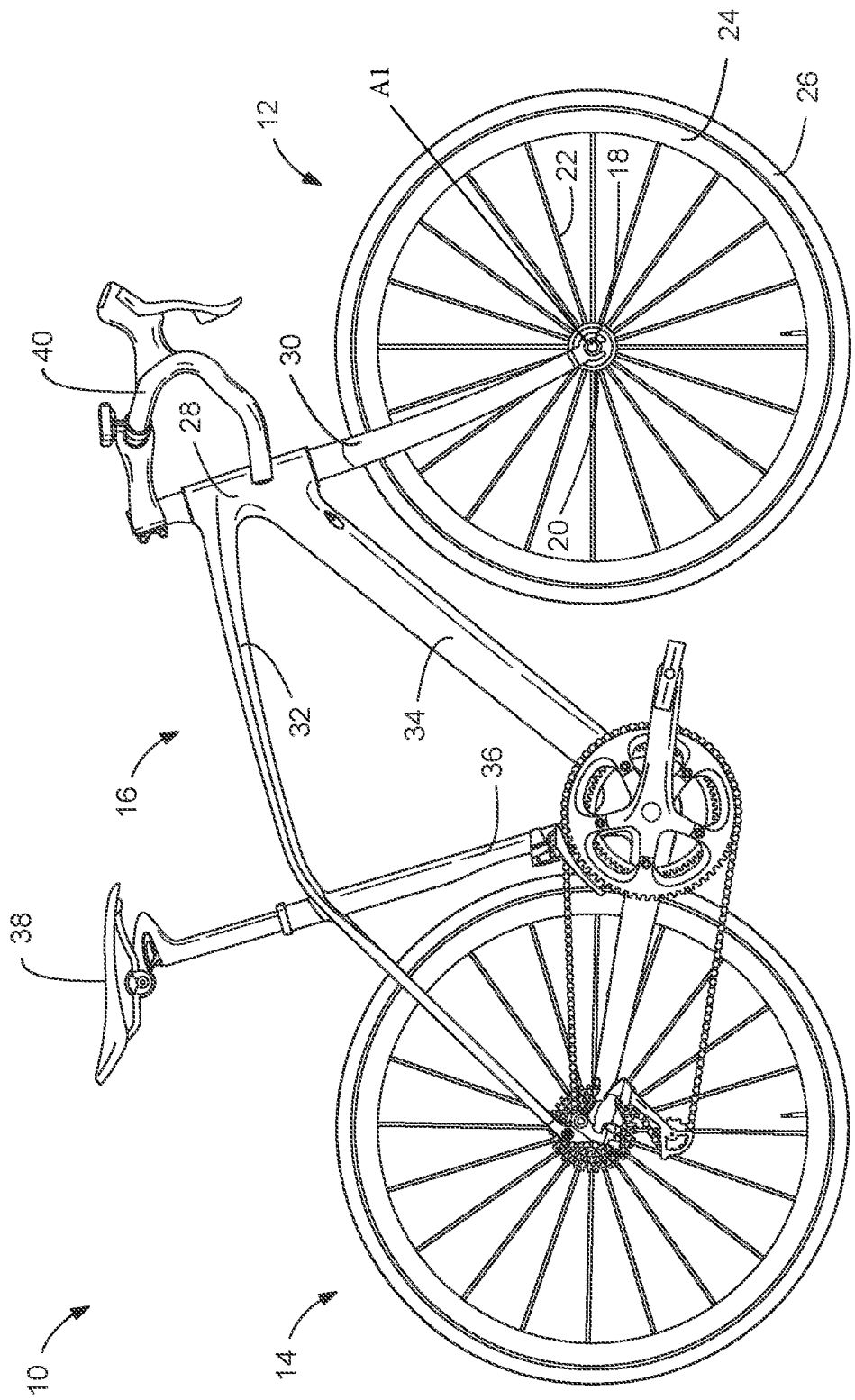
FIG. 1 is a side view of a bicycle including wheels embodying the invention.

FIG. 1 shows a bicycle 10 that includes a front wheel 12, a rear wheel 14, and a frame 16. The front wheel 12 includes an axle 18 (defining a first axis A1), a hub 20 rotationally supported on the axle 18, spokes 22 extending radially from the hub 20, a rim assembly 24 secured to the end of the spokes 22, and a tire 26 supported on the rim assembly 24. The frame 16 has a head tube 28, a front fork 30 rotationally supported by the head tube 28, a top tube 32 connected to and extending rearward from the head tube 28, and a down tube 34 connected to the head tube 28 below the top tube 32 and extending generally downward toward a bottom bracket (not shown) of the frame 16. A seat tube 36 extends upward from the bottom bracket and is connected to the top tube 32, and a seat 38 is supported by the seat tube 36. The bicycle also includes a handlebar 40 for turning the front wheel 12 via the front fork 30.

Figure 2:
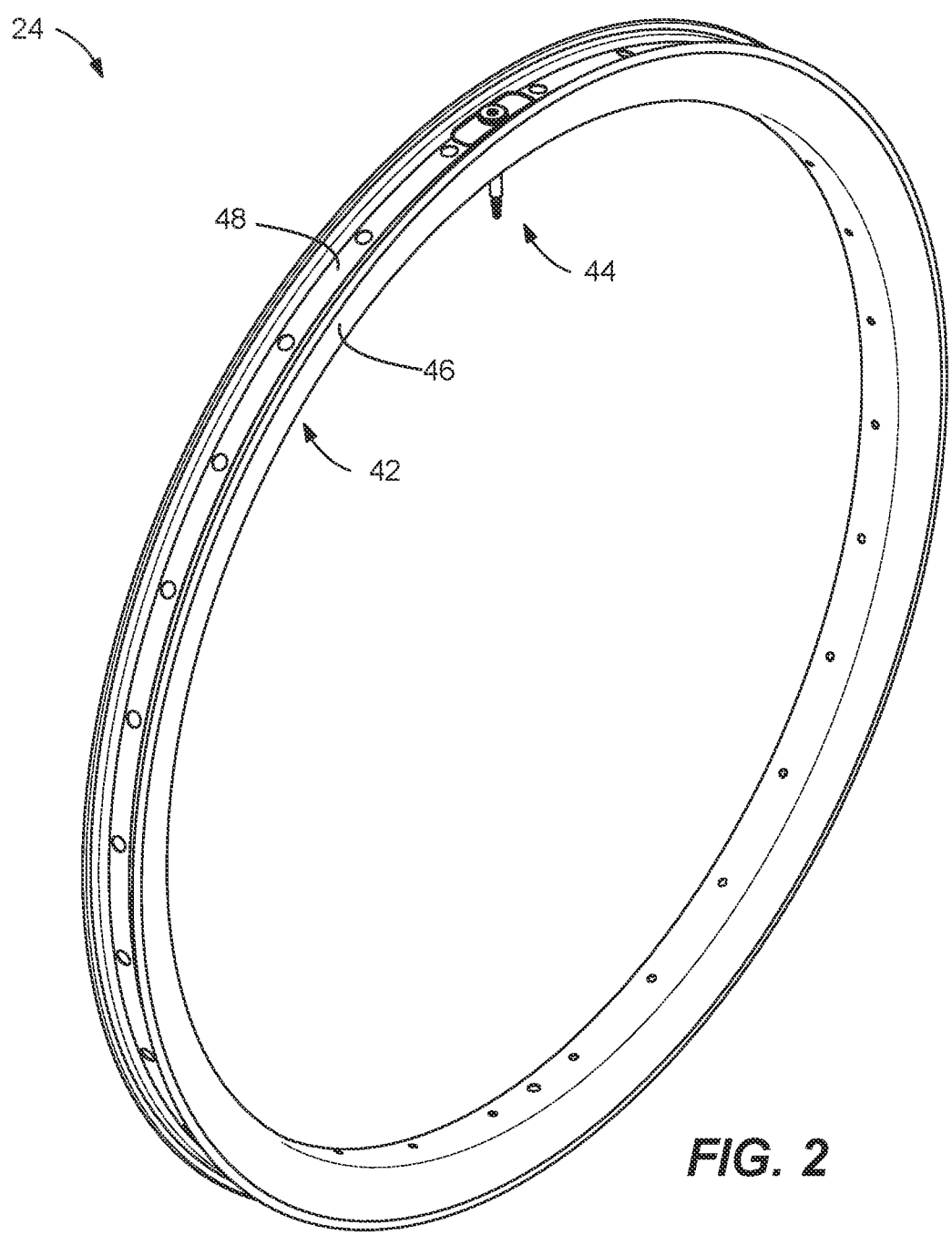
FIG. 2 is a perspective view of a rim assembly from one of the wheels shown in FIG. 1.
Figure 4:
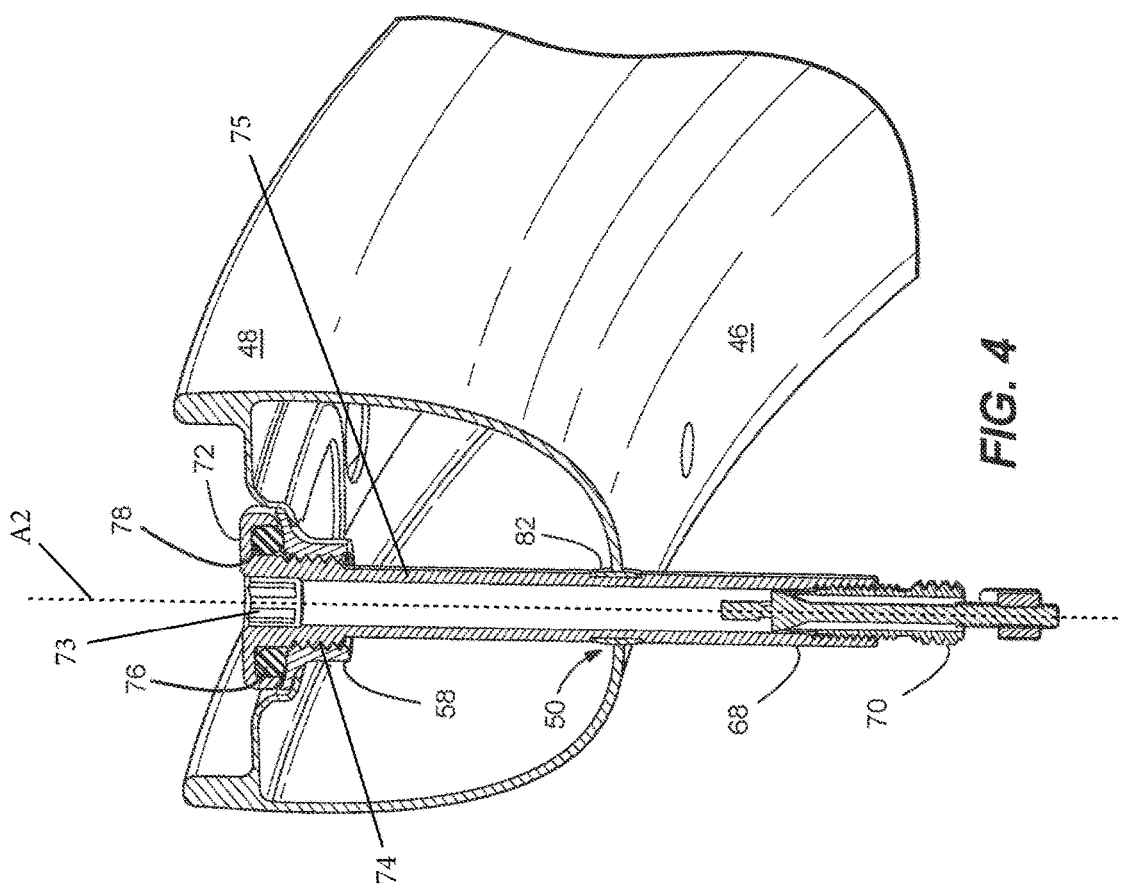
FIG. 4 is a section view taken along line 4-4 in FIG. 2.
Figure 3:
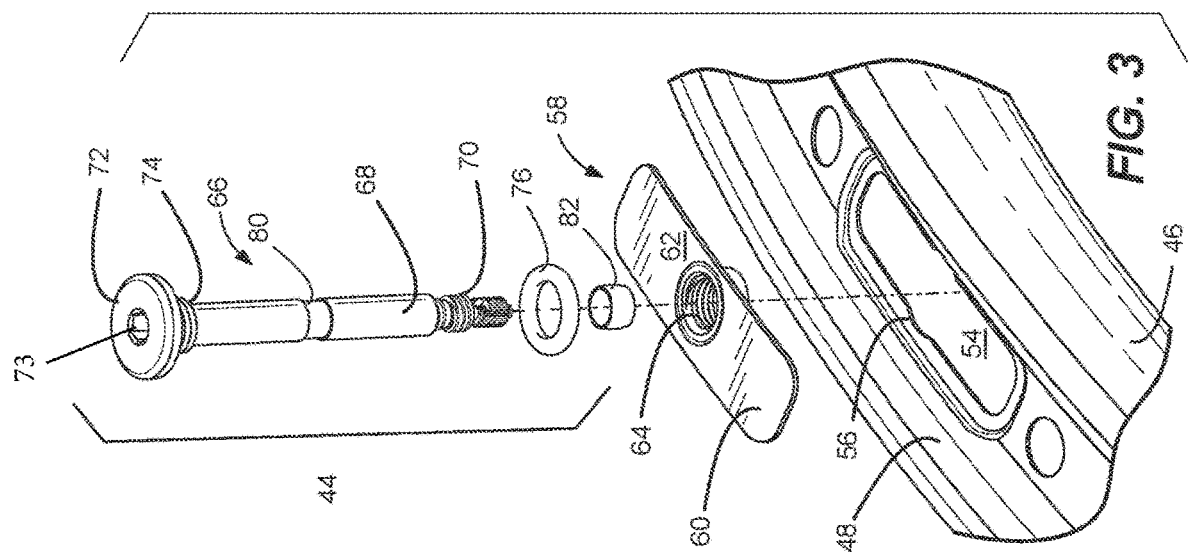
FIG. 3 is an exploded perspective view of a portion of the rim assembly of FIG. 2 including a rim, a threaded insert, and a valve assembly.

FIGS. 2-4 illustrate the rim assembly 24 of the front wheel of FIG. 1, and the rear wheel has a substantially similar rim assembly. The rim assembly 24 includes a rim 42 and a valve assembly 44. The illustrated rim 42 includes a radially inner wall 46 engaging the spokes 22 and a radially outer wall 48 supporting the tire 26. The radially inner wall 46 includes an inner opening 50 (FIG. 4) designed to receive the valve assembly 44, as described below in more detail. The radially outer wall 48 including an aperture 54 defined by a recessed lip 56.

The outer wall 48 further includes a threaded insert 58 comprising a thin plate 60 that is sized to rest on the recessed lip 56 in the aperture 54 such that an upper surface 62 of the threaded insert 58 is recessed below the adjacent surface of the radially outer wall 48. The threaded insert 58 is preferably secured to the rest of the outer wall 48, such as with adhesive or fasteners. The threaded insert 58 includes a first securing feature in the form of an outer opening 64 having inner threads, the function of which is described below in more detail. In the illustrated embodiment, the threaded insert 58 is made of plastic, composite, or a metallic material, such as titanium, aluminum, or steel. Although the threaded insert 58 is shown as a separate part, it should be understood that it could instead be formed integrally with the rest of the outer wall, as described below in connection with the embodiment of FIG. 5.

The valve assembly 44 includes a valve stem 66 comprising a cylindrical body 68 and a plunger valve 70 positioned in the cylindrical body 68, as is generally known in the art to facilitate one-way inflation of the tire. The valve stem 66 further includes an enlarged head 72 on a radially outer end of the cylindrical body 68. The enlarged head 72 may define a polygonal (e.g., hexagonal) opening 73. The polygonal opening 73 may be a socket sized and shaped to receive a tool. A second axis A2 (e.g., perpendicular to the first axis A1) may pass through the polygonal opening 73. The valve stem 66 further includes a second securing feature in the form of outer threads 74 on an exterior surface of the cylindrical body 68 adjacent the enlarged head 72. The outer threads 74 are designed to thread into the outer opening 64 to releasably secure the valve assembly 44 to the rim 42. The outer threads 74 may project radially outwardly relative to the second axis A2. The valve assembly 44 may include an unthreaded region 75 positioned radially inwardly from the outer threads 74 relative to the first axis A1.

The illustrated valve assembly 44 further includes a seal member in the form of an O-ring 76 compressed between the valve stem 66 and the rim 42. The O-ring 76 is positioned in a first annular groove 78 in the underside of the enlarged head 72 of the valve stem 66. Alternatively, the first annular groove 78 can be omitted and the O-ring 76 can be compressed against a flat bottom of the head 72. The illustrated O-ring 76 is made of a synthetic rubber such as Buna-N, natural rubber, or silicone in the hardness range of 40-100 Shore A. The O-ring 76 may extend circumferentially around the polygonal opening 73 and about the second axis A2. The O-ring 76 may extend around and engage an exterior surface of the valve assembly 44. The O-ring may be positioned radially outwardly of the radially outer wall 48 of the rim, relative to the first axis A1. The outer threads 74 may be positioned radially inwardly of the O-ring 76, relative to the first axis A1.

The illustrated valve assembly 44 further includes a second annular groove 80 in an outer surface of the cylindrical body 68 and a resilient bumper 82 positioned in the second annular groove 80 to couple the resilient bumper 82 to the valve stem 66. As shown in FIG. 4, the second annular groove 80 and resilient bumper 82 are aligned with the radially inner wall 46 of the rim 42 such that the resilient bumper 82 is positioned in the inner opening 50, which provides a cushioned connection between the valve stem 66 and the inner wall 46 of the rim 42. This cushioned connection reduces audible rattling that might occur as a result of intermittent contact between the valve stem 66 and the inner wall 46 of the rim 42. Alternatively, the second annular groove 80 can be omitted and the bumper 82 can be secured to a flat cylindrical outer surface of the cylindrical body 68. The bumper can held in place on the cylindrical body 68 by placement in the second annular groove 80, by friction, bonding, co-molding, vulcanization, any combination of these, or any suitable technique. The illustrated bumper 82 is made of a soft plastic, synthetic rubber such as Buna N, natural rubber, or Silicon in the hardness range of 40-100 Shore A.

Figure 5:
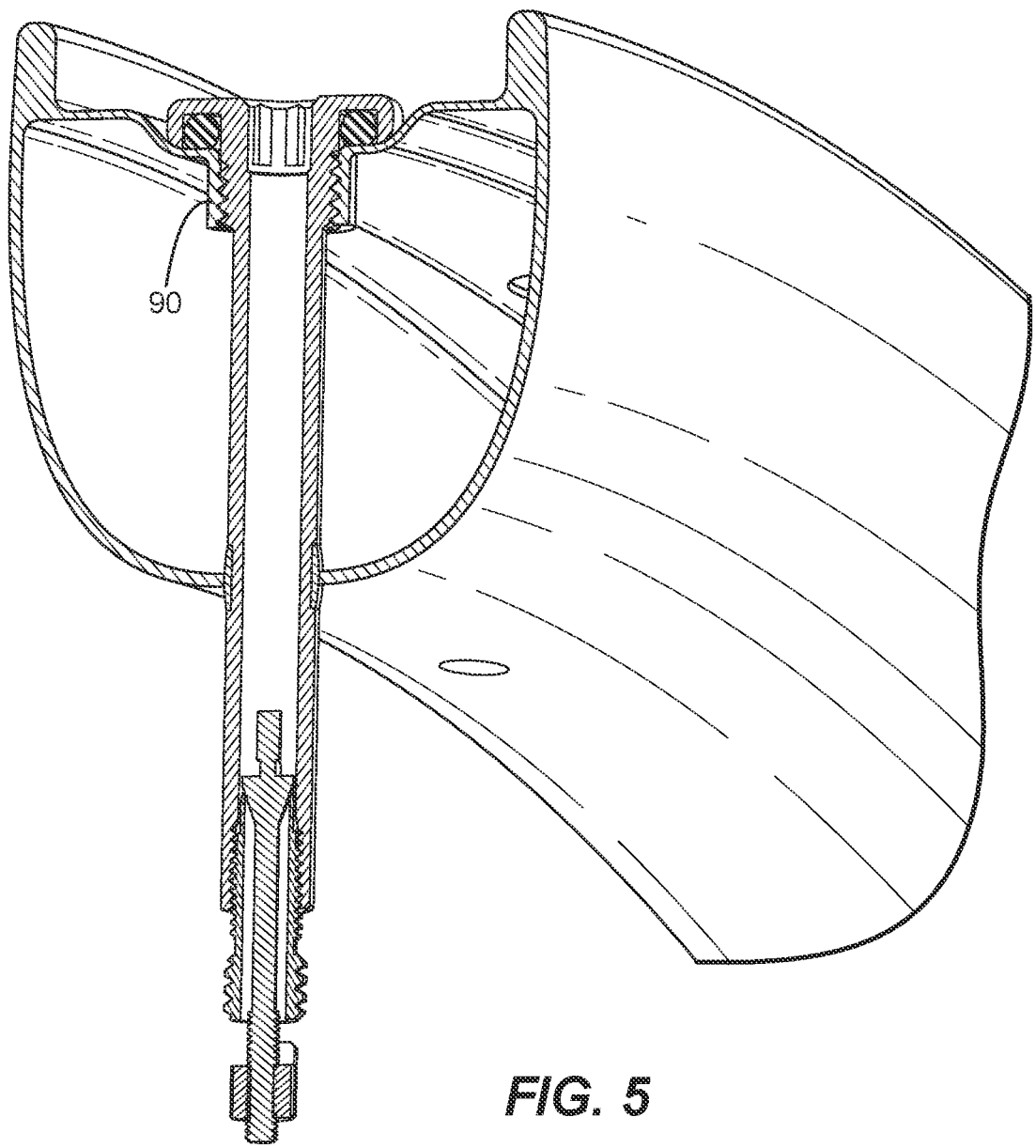
FIG. 5 of a section view of an alternate embodiment with the threaded insert removed.

FIG. 5 illustrates an alternative embodiment of the present invention in which the threaded outer opening is formed integrally with the outer wall of the rim. Specifically, the threaded outer opening of this embodiment is formed in an aluminum rim by a flow drilling process that creates an integral cylindrical chimney 90 that is subsequently tapped with a thread rolling tap to create the threaded outer opening. Alternatively, the threaded outer opening can be formed by any appropriate operation, such as by drilling a hole and securing a blind threaded fastener like a rivet nut.

Figure 6:
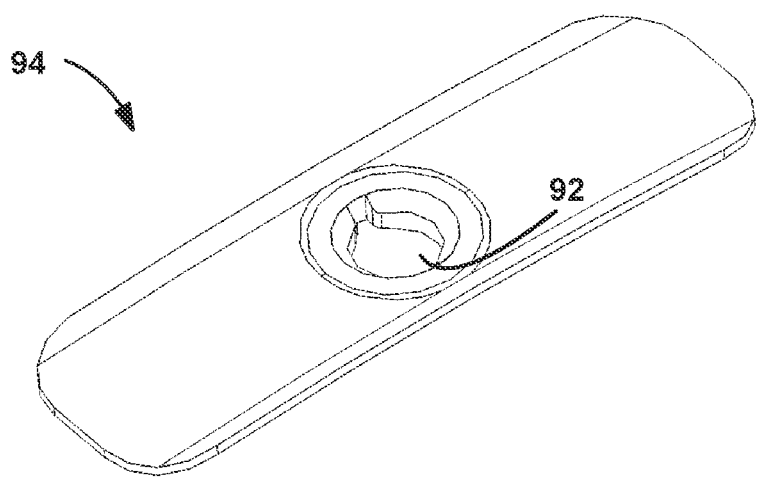
FIG. 6 is a top perspective view of an insert corresponding with a second embodiment of the invention.
Figure 7:
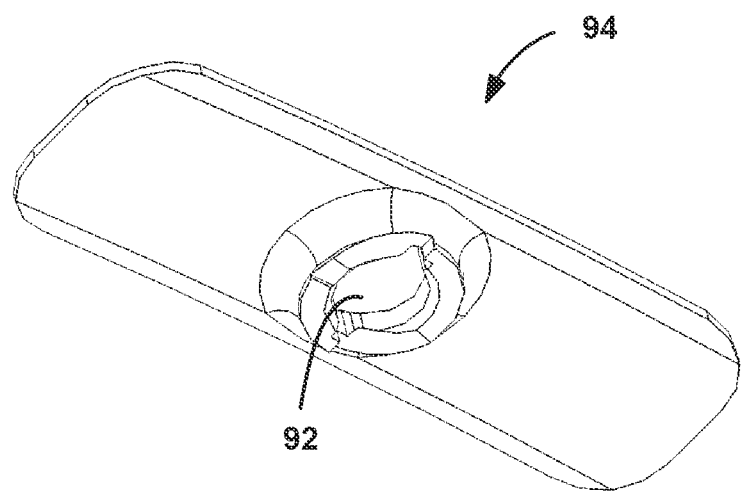
FIG. 7 is bottom perspective view of the insert of FIG. 6.
Figure 8:
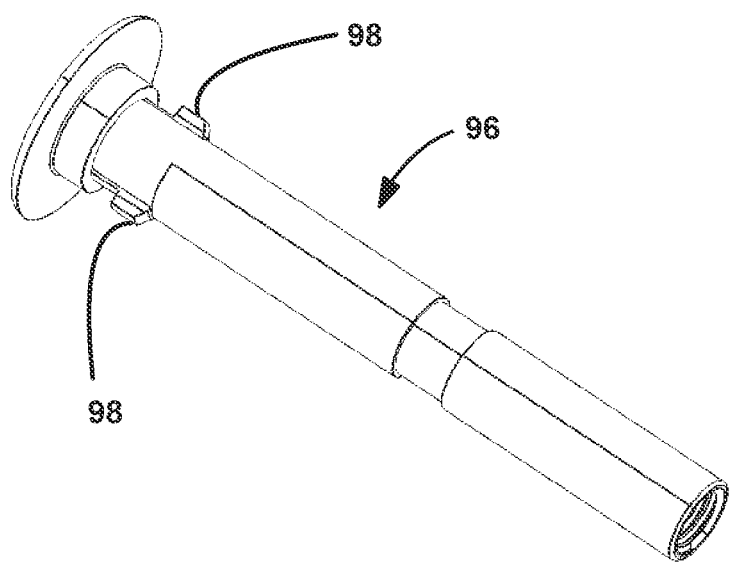
FIG. 8 is a perspective view of a valve body corresponding with the second embodiment of the invention.

It should be understood that the first and second securing features can be embodied in securing mechanisms other than a threaded attachment, For example, in an alternative embodiment illustrated in FIGS. 6-8, the first securing feature is provided by a quarter-turn, cam-type receptacle 92 formed in an insert 94, and the second securing feature is provided by a valve body incorporating a quarter-turn post 96 having tabs 98. The tabs 98 fit into slots in the receptacle 92, and the post 96 can be turned, resulting in sliding of the tabs 98 against cam surfaces on the underside of the receptacle 92 to releasably lock the valve body into the insert 94.

Various features of the invention are set forth in the following claims.

The invention claimed is:
1. An apparatus comprising:
   a bicycle wheel comprising:
      an axle defining an axis;
      a hub mounted for rotation on the axle;
      a rim mounted for rotation with the hub, the rim including a radially inner wall relative to the axis having an inner opening and a radially outer wall relative to the axis having an outer opening, and
      a valve assembly positioned in the inner opening and the outer opening, the valve assembly having a first end, and a second end located opposite the first end, wherein the first end defines a polygonal opening:
      wherein the axis is a first axis, wherein a second axis passes through the polygonal opening, wherein the valve assembly includes a seal member that extends circumferentially around the polygonal opening and about the second axis, wherein the seal member is an O-ring.

2. The apparatus of claim 1, wherein the polygonal opening is a hexagonal polygonal opening.

3. The apparatus of claim 1, wherein the polygonal opening is a socket sized and shaped to receive a tool.

4. The apparatus of claim 1, wherein the O-ring extends around and engages an exterior surface of the valve assembly.

5. The apparatus of claim 1, wherein the first axis is perpendicular to the second axis.

6. The apparatus of claim 1, wherein the seal member is positioned radially outwardly of the radially outer wall of the rim, relative to the first axis.

7. The apparatus of claim 6, wherein the outer threads are positioned radially inwardly of the seal member relative to the first axis.

8. The apparatus of claim 6, wherein the valve assembly includes an unthreaded region positioned radially inwardly from the outer threads relative to the first axis.

9. The apparatus of claim 1, wherein the valve assembly includes outer threads that project radially outwardly relative to the second axis.

10. The apparatus of claim 9, wherein the valve assembly includes an unthreaded region positioned radially inwardly from the outer threads relative to the axle and the first axis.

11. A valve assembly for a bicycle wheel, the bicycle wheel having an axle, a hub mounted for rotation on the axle, and a rim mounted for rotation with the hub, the rim including a radially inner wall having an inner opening and a radially outer wall having an outer opening, the valve assembly comprising:
- a first end;
- a second end located opposite the first end;
- wherein the first end defines a polygonal opening; and
- a seal member that extends circumferentially around the polygonal opening, wherein the seal member is an O-ring.

12. The valve assembly of claim 11, wherein the polygonal opening is a hexagonal polygonal opening.

13. The valve assembly of claim 11, wherein the polygonal opening is a socket sized and shaped to receive a tool.

14. The valve assembly of claim 11, wherein the O-ring extends around and engages an exterior surface of the valve assembly.

15. The valve assembly of claim 11, wherein the seal member is configured to be positioned radially outwardly of the radially outer wall of the rim when the valve assembly is coupled to the wheel.

16. The valve assembly of claim 11, wherein the valve assembly includes outer threads that project radially outwardly relative to an axis that extends through the polygonal opening.

* * * * *